US011097691B2

United States Patent
Kovach

(10) Patent No.: US 11,097,691 B2
(45) Date of Patent: Aug. 24, 2021

(54) WINDOW HEATING SYSTEM FOR VEHICULAR CAMERA

(71) Applicant: Honda Motor Co., Ltd., Tokyo (JP)

(72) Inventor: Steven M. Kovach, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 16/583,477

(22) Filed: Sep. 26, 2019

(65) Prior Publication Data

US 2021/0094512 A1 Apr. 1, 2021

(51) Int. Cl.
*B60S 1/02* (2006.01)
*B60R 11/04* (2006.01)
*H04N 5/225* (2006.01)
*B60R 11/00* (2006.01)

(52) U.S. Cl.
CPC ............... *B60S 1/026* (2013.01); *B60R 11/04* (2013.01); *H04N 5/2253* (2013.01); *H04N 5/22521* (2018.08); *B60R 2011/0026* (2013.01)

(58) Field of Classification Search
CPC .................. G01D 11/245; G01D 11/30; B60R 2011/0026; B60R 11/04; H04N 5/247; H04N 5/225; G03B 15/006; G03B 17/55; B64D 47/00; B64D 47/08; B60S 1/0848
USPC ............................ 348/373–376; 361/600–837
See application file for complete search history.

(56) References Cited

U.S. PATENT DOCUMENTS

| 9,301,343 | B2 | 3/2016 | Ishizeki et al. |
| 9,596,387 | B2 | 3/2017 | Achenbach et al. |
| 10,112,582 | B2 | 10/2018 | Dudar et al. |
| 2017/0334366 | A1 | 11/2017 | Sliwa et al. |
| 2017/0361809 | A1* | 12/2017 | Nagae ..................... H04N 7/183 |
| 2018/0213610 | A1 | 7/2018 | Futatsugi |
| 2019/0031116 | A1 | 1/2019 | Bulgajewski et al. |
| 2019/0033579 | A1 | 1/2019 | Ohsumi et al. |
| 2019/0100158 | A1* | 4/2019 | Wato ..................... B60R 11/04 |
| 2019/0200416 | A1 | 6/2019 | Shinkai |

FOREIGN PATENT DOCUMENTS

JP 2017147031 A 8/2017

* cited by examiner

*Primary Examiner* — Xi Wang

(74) *Attorney, Agent, or Firm* — Plumsea Law Group, LLC

(57) ABSTRACT

A heating system for use with a vehicular camera assembly including a heater bracket having a first surface and a second surface, the first surface having a plurality of adjacent ridges and a valley being defined between at least two of the adjacent ridges; a heating assembly disposed adjacent the second surface of the heater bracket; and at least one through opening in the valley between the at least two adjacent ridges, the at least one through opening extending from the first surface to the second surface of the heater bracket.

17 Claims, 5 Drawing Sheets

WINDOW HEATING SYSTEM FOR VEHICULAR CAMERA

BACKGROUND OF THE INVENTION

1. Field of the Invention

The present invention relates to a window heating system for a vehicular camera, and more particularly, to a front windshield heating system including a heater bracket for mounting a heating element relative to a vehicular camera.

2. Description of Related Art

Vehicular camera systems are generally installed on the inside of the front windshield of a motor vehicle, such as a car, truck, bus, or van, and used for a variety of functions such as object detection, lane keeping, and high beam headlight control, for example. However, these cameras cannot perform their intended safety functions when the windshield glass is blocked by snow, ice, frost, condensation, fog and the like. Accordingly, heating devices have been used near the camera in order to keep the line of visibility clear in front of the mounted camera.

As the number and size of cameras increase and other technology is added to the glass surfaces, however, the required layout space increases. Thus, placement of the heating element directly on the windshield glass as previously done is not practical. Further, the size of the available glass surface and vehicle styling may prevent availability of the additional space required for the large heating components.

There is a thus a need in the art for a window heating system that addresses the shortcomings of the prior art.

SUMMARY OF THE INVENTION

A window heating system is provided to heat the air space adjacent a window in front of a vehicular camera, thereby eliminating any ice or fogging or the like on the window and allowing the camera to maintain a forward line of sight through the windshield.

In one aspect, the invention provides a window heating system for use with a camera mounted in a vehicle, the window heating system including a base plate disposed adjacent a window of the vehicle, a camera assembly bracket configured to mount the camera in the vehicle, a heater bracket disposed relative to the camera assembly bracket such that the heater bracket and the base plate define an air space adjacent the window. The air space forms a field of view for the camera. The heater bracket includes a plurality of adjacent projections, a first one of the plurality of projections and a second one of the plurality of projections defining a valley therebetween. A heating assembly is disposed adjacent a surface of the heater bracket and at least one opening is formed in the valley between the first one and the second one of the plurality of projections such that heat from the heating assembly radiates to the air space adjacent the window.

A further aspect of the invention provides a heating system for use with a vehicular camera assembly in which the heating system includes a heater bracket having a first surface and a second surface, the first surface having a plurality of adjacent ridges, a valley being defined between at least two of the adjacent ridges, a heating assembly disposed adjacent the second surface of the heater bracket, and at least one through opening in the valley between the at least two adjacent ridges, the at least one through opening extending from the first surface to the second surface of the heater bracket.

In another aspect, a heater bracket is provided for use with a heating system for a vehicular camera assembly, the heater bracket including a first surface, and a second surface opposite to the first surface, the first surface having a plurality of adjacent ridges and a valley defined between at least two of the adjacent ridges, and at least one through opening in the valley between the at least two adjacent ridges, the at least one through opening extending from the first surface to the second surface of the heater bracket.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
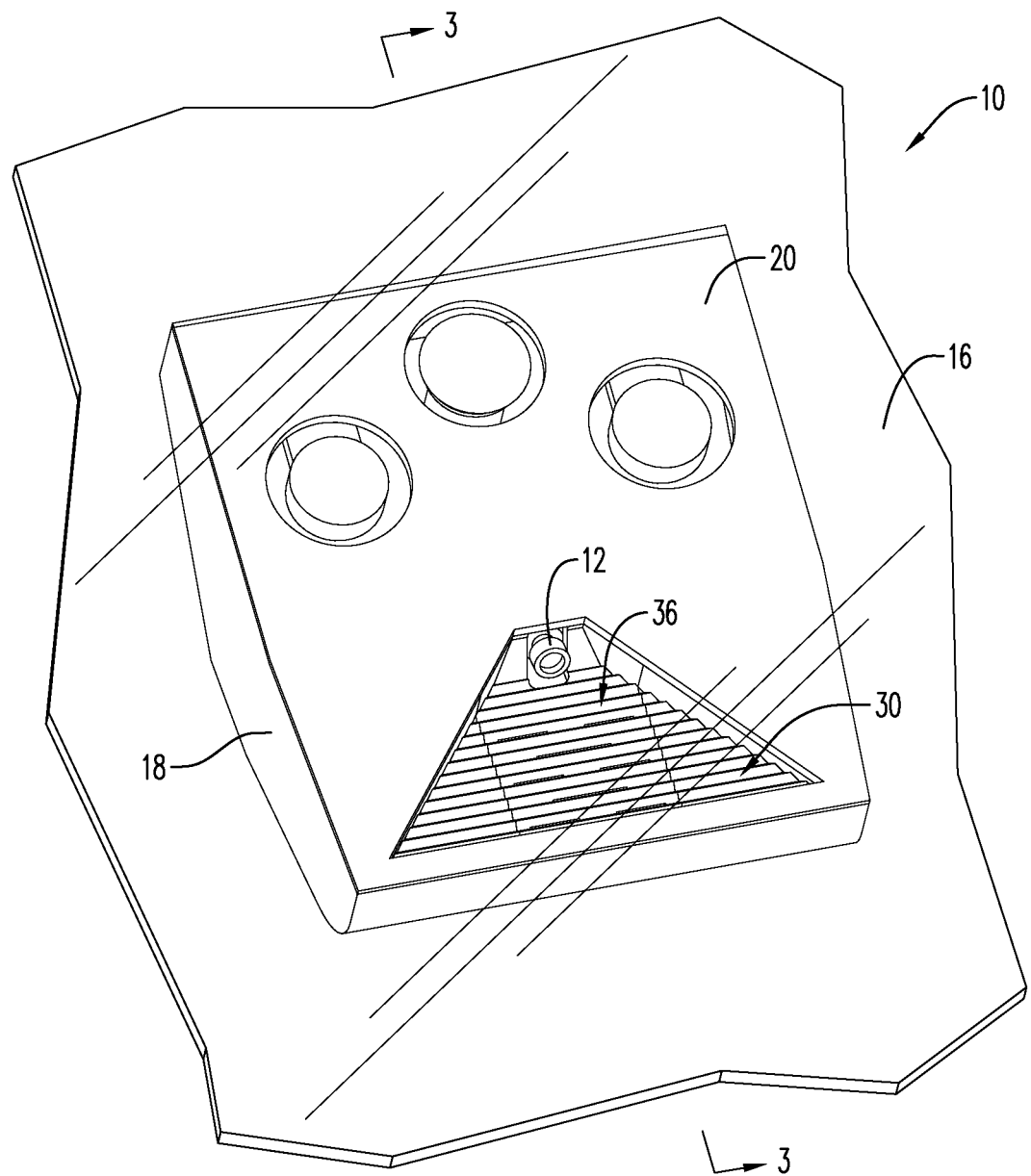
FIG. 1 is a perspective view of a window heating system for a vehicular camera according to an exemplary embodiment of the invention.
Figure 2:
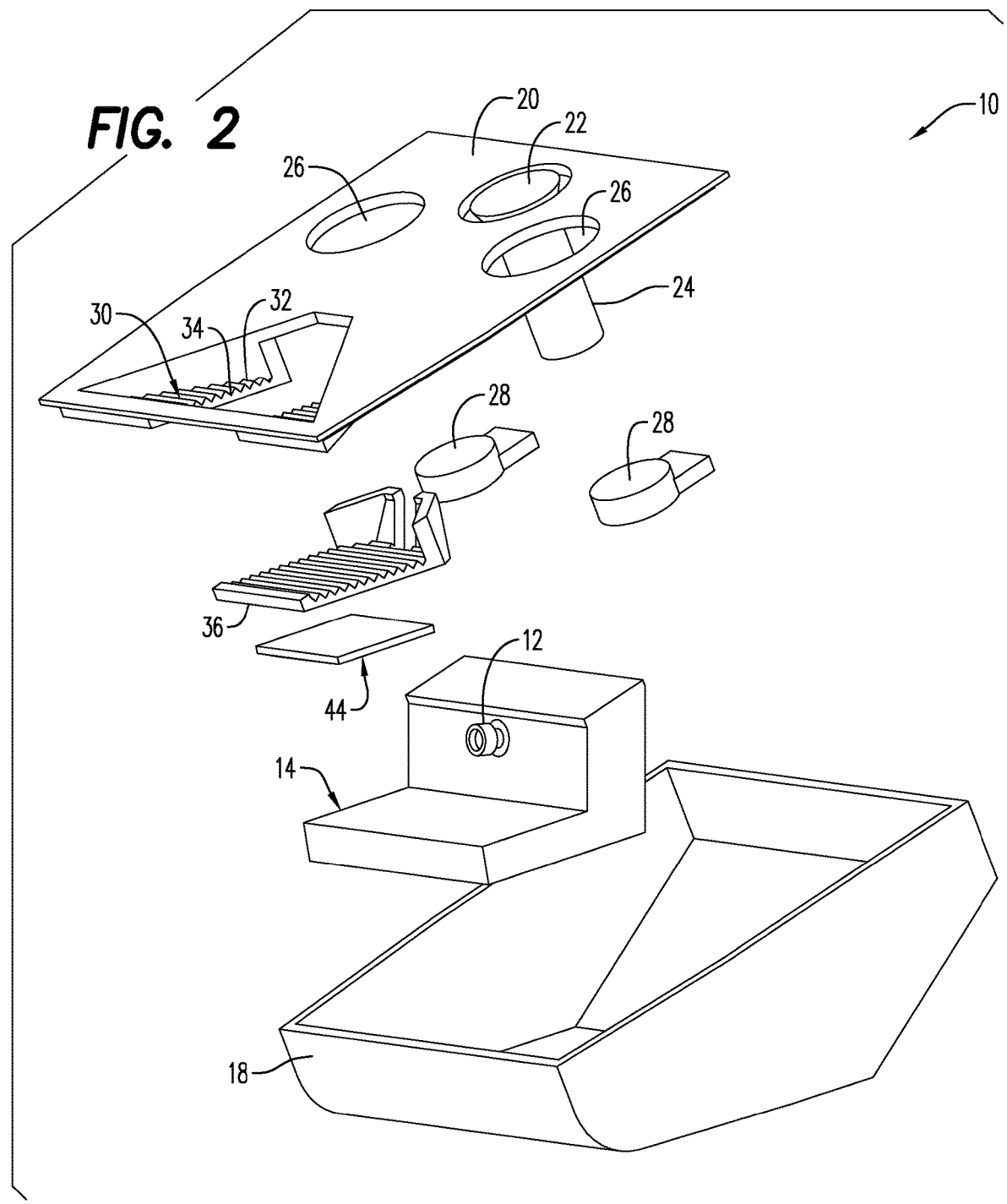
FIG. 2 is an exploded view of the window heating system shown in FIG. 1.
Figure 3:
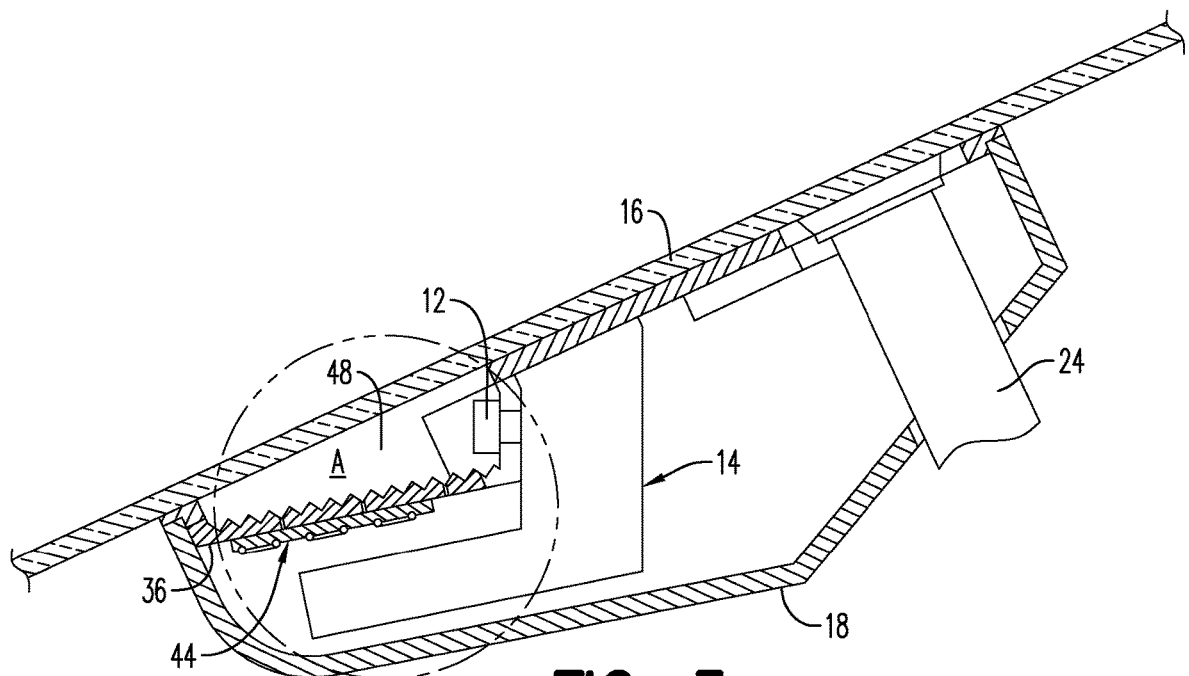
FIG. 3 is a cross-sectional view taken generally along line 3-3 shown in FIG. 1.
Figure 3A:
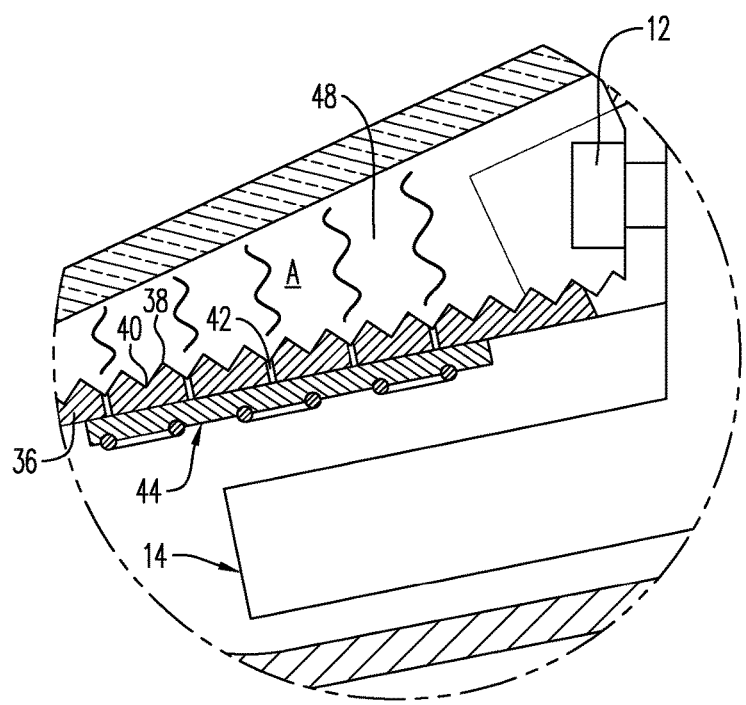
FIG. 3A is an enlarged view of the detail portion shown within the broken line circle in FIG. 3.
Figure 4:
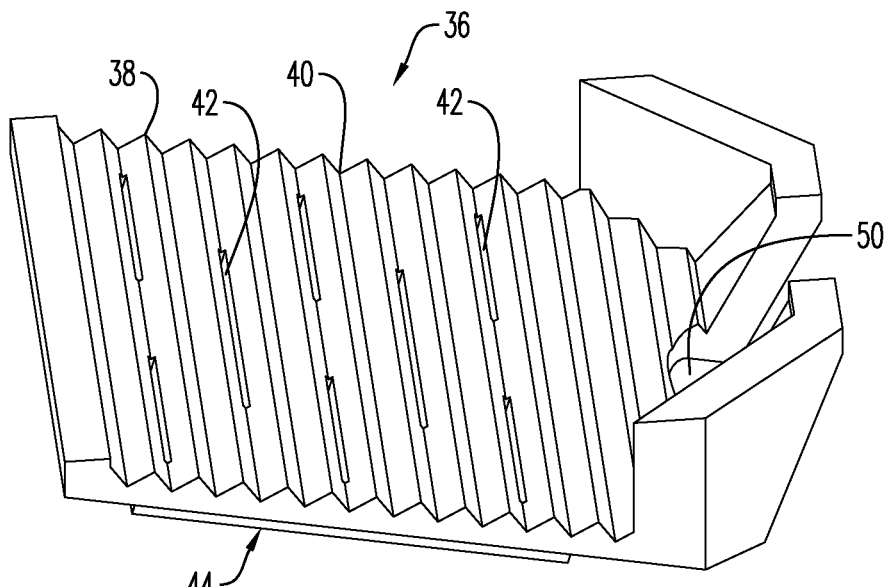
FIG. 4 is a top perspective view of the heating system shown in FIG. 1.
Figure 5:
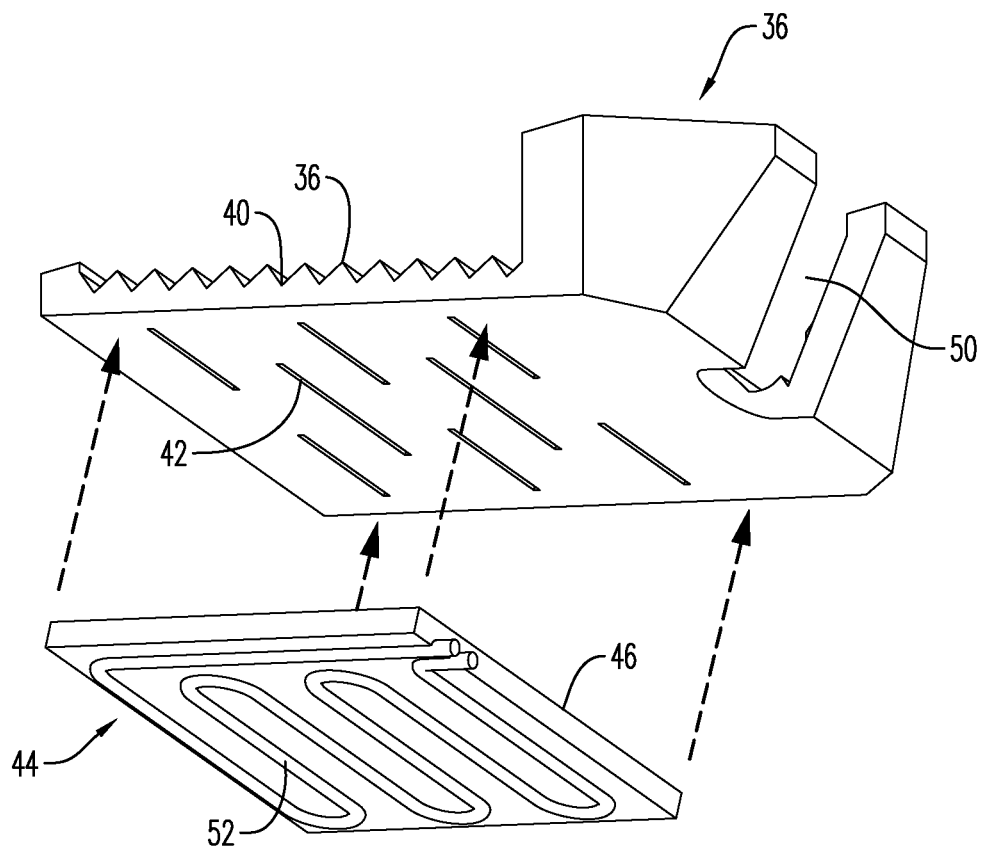
FIG. 5 is an exploded bottom perspective view of the heating system shown in FIG. 4.
Figure 6:
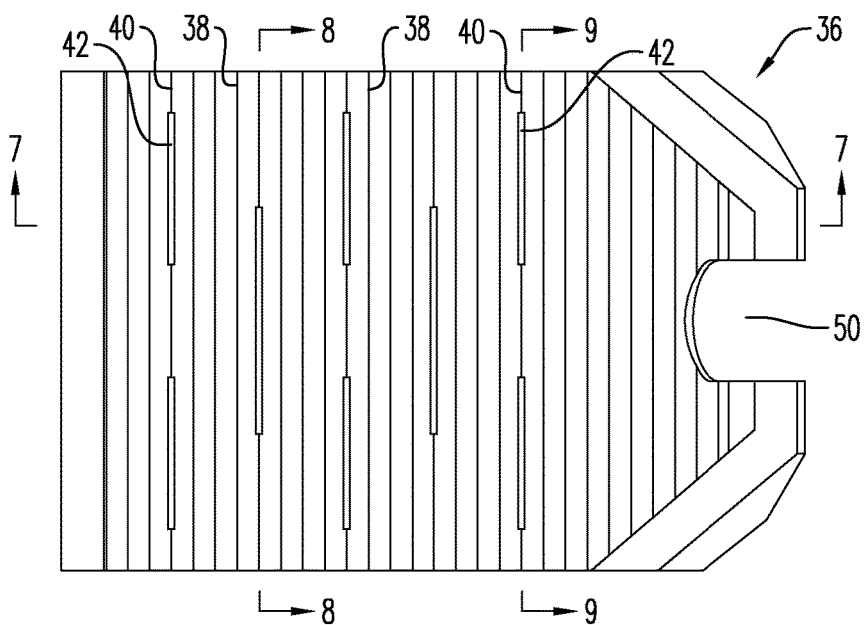
FIG. 6 is a top plan view of the heater bracket for the heating system shown in FIG. 4.
Figure 7:
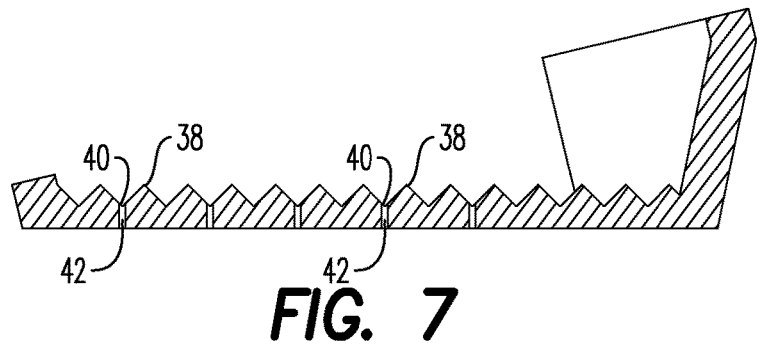
FIG. 7 is a cross-sectional view of the heater bracket taken generally along line 7-7 shown in FIG. 6.
Figure 8:
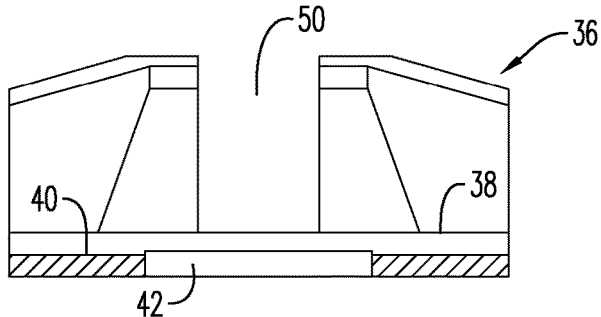
FIG. 8 is a cross-sectional view of the heater bracket taken generally along line 8-8 shown in FIG. 6.
Figure 9:
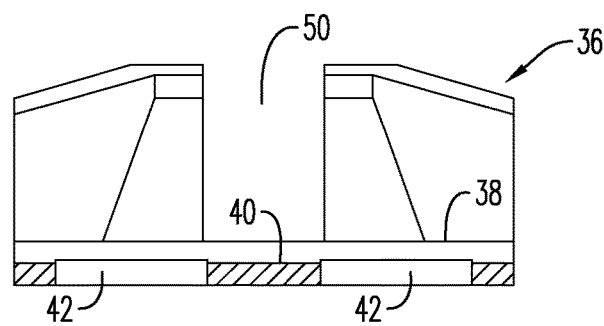
FIG. 9 is a cross-sectional view of the heater bracket taken generally along line 9-9 shown in FIG. 6.

A window heating system for a vehicular camera in accordance with an exemplary embodiment of the disclosure is shown generally in FIGS. 1-3 as reference numeral 10. The window heating system 10 is provided in connection with a front viewing camera 12 mounted by a camera assembly bracket 14 in a vehicle (not shown).

The camera 12 is mounted underneath a cover 18 adjacent to the front windshield 16 of the vehicle to provide a forward field of view through the windshield 16. The cover 18 is connected to a cover base plate 20 configured to be secured onto the windshield 16. The base plate 20 has an opening 22 to accommodate the mounting mechanism 24 for a rear view mirror (not shown). The base plate may further include one or more openings 26 for receiving sensors 28, such as rain sensing sensors or other components requiring contact with the windshield 16. The base plate 20 is configured with a camera access region 48 having a camera lens through opening 50 which allows the camera 12 to maintain a forward line of sight through the windshield 16. That is, the camera access region 48 forms an air space A between the base plate 20 and the windshield 16. A lower surface of the camera access region 48, i.e., the surface facing the windshield 16, includes at least one glare shield 30 having a plurality of ridges or projections 32 which form a plurality of valleys or depressions 34 therebetween. The pattern of ridges or projections 32 is arranged to provide an anti-glare surface which prevents reflection of the sunlight into the camera 12. The sunlight reflection into the camera 12 would create a bright spot obscuring the view of the camera 12. The pattern of the ridges or projections 32, such as the spacing between projections 32 and the height thereof, is determined based upon the angle of the windshield 16 and the desired camera field of view. Hence, different vehicles may require differently configured glare shields 30.

The heating system 10 includes a heater bracket 36 and a heating assembly 44 having a heater element 46 such as, for example, an electrically heated pad, mounted to an interior vehicle side of the heater bracket 36. The heater element 46 is secured so as to correspond to the portion of the heater bracket 36 that is located in front of the camera 12 (i.e., downwardly along the windshield 16 from the location of camera 12). Similar to the glare shield 30, a first or upper surface of the heater bracket 36, i.e., the surface that confronts or faces the windshield 16, also includes a pattern of ridges or projections 38 and valleys 40 therebetween which provide an anti-glare feature for the camera 12. The heater element 46 is located on a second opposite (lower or interior vehicle side) surface of the heater bracket 36 relative to the projections 38 such that the heater bracket 36 is disposed between the heater element 46 and the windshield 16.

Referring also to FIGS. 3A-9, the heater bracket 36 includes a plurality of bracket openings or perforations 42 extending through the heater bracket 36 at multiple locations in order to facilitate heat transfer from the heater element 46 to the windshield 16. The openings 42 extend entirely through the material of the heater bracket 36 from the first surface to the second surface. That is, as understood best with reference to FIG. 3A, the heat generated by heater element 46 readily radiates through the openings 42 so as to heat the air space A immediately adjacent the windshield 16. According to the exemplary embodiment, each of the bracket openings 42 is located between an adjacent pair of the ridge projections to minimize removal of the pattern material on the upper surface of the heater bracket. The openings 42 illustrated herein have a generally elongated slot configuration, however, one skilled in the art will recognize that any size and shape of perforation or opening in the heater bracket 36 could be used to facilitate heat transfer from the heater element to the space A immediately adjacent the windshield 16.

The heating system 10 can be activated to turn on the heater element 46 from one or more sources inside the vehicle, such as, for example, when the defrost switch is activated by the driver, or it can be controlled by the camera 12 itself such that the heating system 10 will turn on when the camera is in use. The heating system 10 can also be activated based upon the exterior ambient air temperature. The heating system 10 further includes a thermal fuse (not shown) or another mechanism that will turn off the heating system 10 when the heating element 46 reaches predetermined temperature. The thermal fuse is configured such that the heating system 10 rapidly heats the volume of air within air space A in front of the camera 12. Of course, turning off the defrost switch, sensing an increased ambient air temperature or the camera visual direction could also be used as mechanisms to deactivate the heating system 10.

The window heating system 10 and camera 12 are shown as being mounted onto the front window or windshield of an automobile, but could of course also be configured for use with a rear view or back-up camera, side view camera, or used to heat any other vehicle glass surface as necessary for assisted drive vehicles or automated drive vehicles.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A window heating system for use with a camera mounted in a vehicle, the window heating system comprising:
    a base plate disposed adjacent a window of the vehicle;
    a camera assembly bracket configured to mount the camera in the vehicle;
    a heater bracket disposed relative to the camera assembly bracket such that the heater bracket and the base plate define an air space adjacent the window, the air space forming a field of view for the camera, the heater bracket including a plurality of adjacent projections extending transversely across the air space and configured to reduce reflection of sunlight into the camera, a first one of the plurality of projections and a second one of the plurality of projections defining a valley therebetween;
    a heating assembly disposed adjacent a surface of the heater bracket; and
    at least one opening formed in the valley between the first one and the second one of the plurality of projections such that heat from the heating assembly radiates to the air space adjacent the window.

2. The window heating system according to claim 1, further comprising a cover connected to the base plate and enclosing the camera assembly, heater bracket and heating assembly.

3. The window heating system according to claim 1, wherein the base plate includes a recess forming a camera access region having an opening for a lens of the camera, a lower surface of the camera access region including an open section and a glare shield on each side of the open section.

4. The window heating system according to claim 3, wherein the heater bracket is configured to be disposed within the open section of the camera access region.

5. The window heating system according to claim 4, wherein the glare shield includes a plurality of adjacent projections, a first one of the plurality of projections of the glare shield and a second one of the plurality of projections of the glare shield defining a glare shield valley therebetween.

6. The window heating system according to claim 5, wherein the heater bracket is disposed within the open section of the camera access region such that the plurality of adjacent projections on the heater bracket are aligned with the plurality of adjacent projections on the glare shield.

7. The window heating system according to claim 1, wherein the at least one opening formed in the valley between the first one and the second one of the plurality of projections comprises a plurality of openings.

8. The window heating system according to claim 1, wherein the at least one opening formed in the valley between the first one and the second one of the plurality of projections comprises an elongated slot.

9. The window heating system according to claim 1, wherein the heating assembly includes a heating pad.

10. A heating system for use with a vehicular camera assembly configured to be disposed adjacent a window of a vehicle, the heating system comprising:
   a heater bracket having a first surface and a second surface, the first surface comprising a plurality of adjacent ridges, a valley being defined between at least two of the plurality of adjacent ridges;
   a heating assembly disposed adjacent the second surface of the heater bracket such that the heater bracket is disposed between the heating assembly and the window of the vehicle; and
   at least one through opening in the valley between the at least two adjacent ridges, the at least one through opening extending from the first surface to the second surface of the heater bracket.

11. The heating system according to claim 10, wherein the at least one through opening in the valley between the at least two adjacent ridges comprises a plurality of through openings.

12. The heating system according to claim 11, wherein each of the plurality of through openings comprises an elongated slot.

13. The heating system according to claim 10, wherein the heating assembly includes a heating pad.

14. The heating system according to claim 10, wherein the heating assembly includes a heating element such that heat generated by the heating element radiates through the at least one through opening from the second surface of the heater bracket to the first surface of the heater bracket.

15. A heater bracket for use with a heating system for a vehicular camera assembly, the heater bracket comprising:
   a bracket portion having a predetermined material thickness defined between a first side and an opposing second side, the first side comprising a plurality of adjacent ridges and a valley defined between at least two of the plurality of adjacent ridges; and
   at least one through opening in the valley between the at least two adjacent ridges, the at least one through opening extending through the material thickness of the bracket portion from the first side to the second side of the heater bracket whereby the first side is in communication with the second side.

16. The heating system according to claim 15, wherein the at least one through opening comprises a plurality of through openings.

17. The heating system according to claim 16, wherein each of the plurality of through openings comprises an elongated slot.

\* \* \* \* \*